(12) United States Patent  
Lee et al.

(10) Patent No.: US 11,783,507 B2  
(45) Date of Patent: Oct. 10, 2023

(54) CAMERA CALIBRATION APPARATUS AND OPERATING METHOD

(71) Applicant: SAMSUNG ELECTRONICS CO., LTD., Suwon-si (KR)

(72) Inventors: Jaewoo Lee, Hwaseong-si (KR); Sangjun Lee, Suwon-si (KR); Wonju Lee, Seongnam-si (KR)

(73) Assignee: Samsung Electronics Co., Ltd.

( * ) Notice: Subject to any disclaimer, the term of this patent is extended or adjusted under 35 U.S.C. 154(b) by 157 days.

(21) Appl. No.: 17/380,790

(22) Filed: Jul. 20, 2021

(65) Prior Publication Data

US 2022/0067973 A1 Mar. 3, 2022

(30) Foreign Application Priority Data

Aug. 25, 2020 (KR) .................. 10-2020-0107404

(51) Int. Cl.
| | |
|---|---|
| *G06T 7/80* | (2017.01) |
| *G06T 7/20* | (2017.01) |
| *B60R 11/04* | (2006.01) |
| *G06V 20/56* | (2022.01) |

(52) U.S. Cl.  
CPC ............... *G06T 7/80* (2017.01); *B60R 11/04* (2013.01); *G06T 7/20* (2013.01); *G06V 20/56* (2022.01); *G06T 2207/30256* (2013.01)

(58) Field of Classification Search  
CPC ........ H04N 13/221; H04N 23/60; G06T 7/74; G06T 2207/10028; G06T 2207/30204; G06T 7/579; G06T 7/207; G06T 7/73; G06T 17/00; G06T 2200/08; G06T 2207/10016; G06T 15/205; G06T 3/0093; G06T 7/11; G06T 7/20; G06T 2211/416; G06V 10/40

See application file for complete search history.

(56) References Cited

U.S. PATENT DOCUMENTS

| | | | |
|---|---|---|---|
| 8,780,177 | B2 | 7/2014 | Eccles et al. |
| 9,688,200 | B2 | 6/2017 | Knudsen |
| 10,032,274 | B2 | 7/2018 | Nakai |
| 10,176,594 | B2 | 1/2019 | Tanaka et al. |
| 2011/0216194 | A1* | 9/2011 | Kosaki ............... H04N 7/18 348/148 |

(Continued)

FOREIGN PATENT DOCUMENTS

| | | |
|---|---|---|
| KR | 100969576 | 7/2010 |
| KR | 101245529 | 3/2013 |

(Continued)

*Primary Examiner* — Md K Talukder  
(74) *Attorney, Agent, or Firm* — Fish & Richardson P.C.

(57) ABSTRACT

A camera calibration includes; a camera configured to acquire a first forward image from a first viewpoint and a second forward image from a second viewpoint; an event trigger module configured to determine whether to perform camera calibration; a motion estimation module configured to acquire information related to motion of a host vehicle; a three-dimensional reconstruction module configured to acquire three-dimensional coordinate values based on the first forward image and the second forward image; and a parameter estimation module configured to estimate an external parameter of the camera based on the three-dimensional coordinate values.

17 Claims, 9 Drawing Sheets

(56) References Cited

U.S. PATENT DOCUMENTS

| | | | | |
|---|---|---|---|---|
| 2015/0145965 A1* | 5/2015 | Livyatan | ............. | H04N 13/239 |
| | | | | 348/47 |
| 2016/0063330 A1* | 3/2016 | Xu | ............................ | G06T 7/73 |
| | | | | 382/103 |
| 2018/0286078 A1* | 10/2018 | Kimoto | ................... | H04N 23/60 |
| 2018/0292201 A1* | 10/2018 | Sakano | .................... | H04N 7/18 |
| 2018/0316905 A1* | 11/2018 | Nobori | ................ | H04N 13/239 |
| 2019/0028632 A1* | 1/2019 | Nobori | ................ | H04N 13/122 |
| 2021/0343044 A1* | 11/2021 | Lee | ....................... | H04N 23/695 |
| 2022/0067973 A1* | 3/2022 | Lee | ....................... | G06V 20/56 |

FOREIGN PATENT DOCUMENTS

| | | |
|---|---|---|
| KR | 101489468 | 2/2015 |
| KR | 1020150077081 | 8/2015 |
| KR | 1020150135697 | 1/2016 |
| KR | 1020180052415 | 5/2018 |
| KR | 101935512 | 4/2019 |
| KR | 102060113 | 12/2019 |

\* cited by examiner

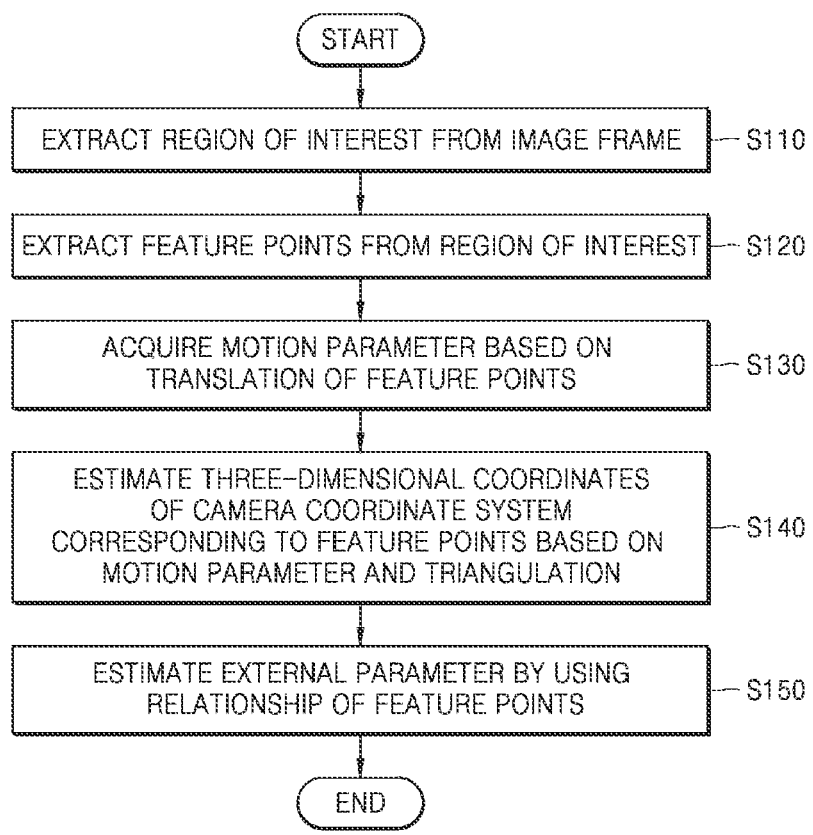

CAMERA CALIBRATION APPARATUS AND OPERATING METHOD

CROSS-REFERENCE TO RELATED APPLICATION

This application claims priority under 35 U.S.C. § 119 to Korean Patent Application No. 10-2020-0107404 filed on Aug. 25, 2020 in the Korean Intellectual Property Office, the subject matter of which is hereby incorporated by reference.

BACKGROUND

Embodiments of the inventive concept relate to camera calibration apparatuses. More particularly, embodiments of the inventive concept relate to camera calibration apparatuses capable of estimating an external parameter associated with a camera. Embodiments of the inventive concept also relate to operating methods for camera calibration apparatuses.

Image capturing devices including image sensor(s) are routinely provided in various electronic devices such as smartphones, personal computers, monitoring cameras, and autonomous vehicles. Some image capturing devices may be used as independent electronic devices.

Using various image sensors such as those associated with a camera, an autonomous vehicle may travel safely by recognizing distance(s) between itself and neighboring vehicle(s) and/or nearby objects. However, as the autonomous vehicle continues to travels along its route, the relative position and direction of movement, among other parameters associated with the camera, may change. Accordingly, it is necessary that the autonomous vehicle frequently calibrate the camera in relation to external parameter(s).

SUMMARY

Embodiments of the inventive concept relate to camera calibration apparatuses and camera calibration methods that estimate an external parameter for a camera. Embodiments of the inventive concept also relate to vehicles including such camera calibration apparatuses and/or using such camera calibration methods.

According to an aspect of the inventive concept, there is provided a camera calibration apparatus including; a camera configured to acquire a first forward image from a first viewpoint and a second forward image from a second viewpoint, an event trigger module configured to determine whether to perform camera calibration, a motion estimation module configured to acquire information related to motion of a host vehicle, a three-dimensional reconstruction module configured to acquire three-dimensional coordinate values based on the first forward image and the second forward image, and a parameter estimation module configured to estimate an external parameter for the camera based on the three-dimensional coordinate values.

According to an aspect of the inventive concept, there is provided a camera calibration method including; extracting a region of interest from a first forward image and from a second forward image, extracting feature points from the region of interest, acquiring a motion parameter based on translation of the feature points, estimating three-dimensional coordinate values of a camera coordinate system corresponding to the feature points using triangulation based on the acquired motion parameter, and estimating an external parameter for a camera using a relationship of the feature points and the three-dimensional coordinate values.

According to an aspect of the inventive concept, there is provided a host vehicle including; a camera configured to acquire a first forward image from a first viewpoint and a second forward image from a second viewpoint, an image signal processor configured to determine whether to perform camera calibration, acquire information related to motion of the host vehicle, acquire three-dimensional coordinate values based on the first forward image and the second forward image, estimate an external parameter for the camera based on the three-dimensional coordinate values, and generate a control signal in response to the external parameter, and a vehicle controller configured to control operation of the host vehicle in response to the control signal.

BRIEF DESCRIPTION OF THE DRAWINGS

Embodiments of the inventive concept will be more clearly understood from the following detailed description taken in conjunction with the accompanying drawings in which:

FIG. 6 is a flowchart summarizing a method of operation for a camera calibration apparatus according to embodiments of the inventive concept.

DETAILED DESCRIPTION

Embodiments of the inventive concept will be described with reference to the accompanying drawings. Throughout the written description and drawings, like reference numbers and labels are used to denote like or similar elements and/or features.

Figure 1:
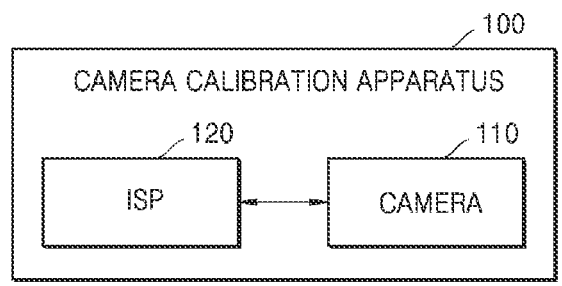
FIG. 1 is a block diagram illustrating a camera calibration apparatus according to embodiments of the inventive concept.

Figure (FIG. 1 is a block diagram of a camera calibration apparatus 100 according to embodiments of the inventive concept.

Referring to FIG. 1, the camera calibration apparatus 100 may generally include a camera 110 and an image signal processor (ISP) 120.

In some embodiments, the camera calibration apparatus 100 may be embedded within, or be implemented by, an electronic device, such as a personal computer (PC), an Internet of Things (IoT) device, or a portable electronic device. In this regard, the portable electronic device may include a laptop computer, a mobile telephone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

In some embodiments, the camera 110 may be embedded in a host vehicle in order to recognize an external environment associated with the host vehicle. For example, the camera 110 (e.g., a pinhole camera) may be used to generate an image by converting electromagnetic energy (e.g., visible light) incident to the camera from one or more arbitrary direction(s) (e.g., a forward direction) into a corresponding electrical signal (e.g., a digital image signal). Thereafter, the corresponding electrical signal may be communicated to the ISP 120 for further analysis and/or processing.

In some embodiments, the camera 110 may be associated with one or more internal parameter(s) and/or one or more external parameter(s). Internal parameters include, by way of example, certain camera-internal values such as focal length, principal point and skew coefficient, etc. Here, the focal length may be a distance between a lens of the camera 110 and an image sensor, wherein a unit of the focal length may be defined as a pixel. The principal point may be image coordinates of a point at which a number line of a center point of a lens intersects with the image sensor. The skew coefficient may be a tilt angle (expressed e.g., in terms of a y-axis) for a cell array of the image sensor included in the camera 110.

External parameters include, by way of example, a three-dimensional position of the camera 110 (or a relative, three-dimensional posture of the camera 110) that may be expressed in terms of roll, pitch, yaw, camera height values, etc.

In some embodiments, the ISP 120 may be used to estimate an external parameter associated with the camera 110 based on an image captured by the camera 110. (Hereafter, a forward facing image is assumed for descriptive purposes). In this regard, the ISP 120 may calculate a motion parameter based on a change in feature points on an image plane acquired from the camera 110. Then, based on the calculated motion parameter, the ISP 120 may perform triangulation that converts feature points on the image plane into three-dimensional coordinates of a camera coordinate system. Then, the ISP may estimate the external parameter using relationship(s) between the feature points. In some embodiments, the estimated external parameter may be expressed using a pitch angle, a roll angle and a camera height.

Figure 2:
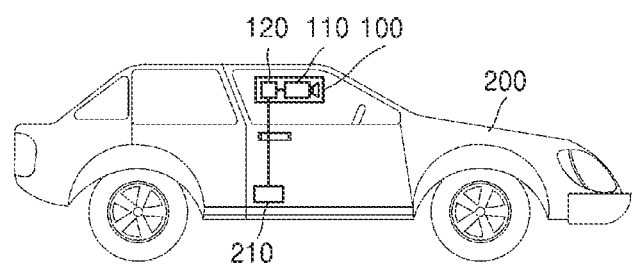
FIG. 2 is a conceptual diagram illustrating a host vehicle including the camera calibration apparatus of FIG. 1 according to embodiments of the inventive concept.

FIG. 2 is a conceptual diagram of a host vehicle 200 according to embodiments of the inventive concept. In this regard, the host vehicle 200 may be variously referred to as an ego-vehicle, a self-vehicle or an autonomous vehicle.

Referring to FIG. 2, the host vehicle 200 may include the camera calibration apparatus 100 of FIG. 1, as well as a vehicle controller 210. In some embodiments, the camera calibration apparatus 100 may be embedded within the host vehicle 200.

The vehicle controller 210 may be used to control overall operation of the host vehicle 200. Thus, the vehicle controller 210 may acquire distance information associated with a nearby target vehicle from the ISP 120 of the camera calibration apparatus 100. In this regard, a target vehicle is assumed as one example of many different target objects that may be subject to distance information acquisition.

Distance information related to the target vehicle may include a distance value corrected in relation to an external parameter estimated by the camera calibration apparatus 100. The vehicle controller 210 may control the speed of the host vehicle 200 based on the target vehicle distance information. For example, when the target vehicle distance information falls below a predefined value associated with a risk of collision, the vehicle controller 210 may generate a control signal causing deceleration of the host vehicle 200 and/or a control signal applying brakes to the host vehicle 200.

Figure 3:
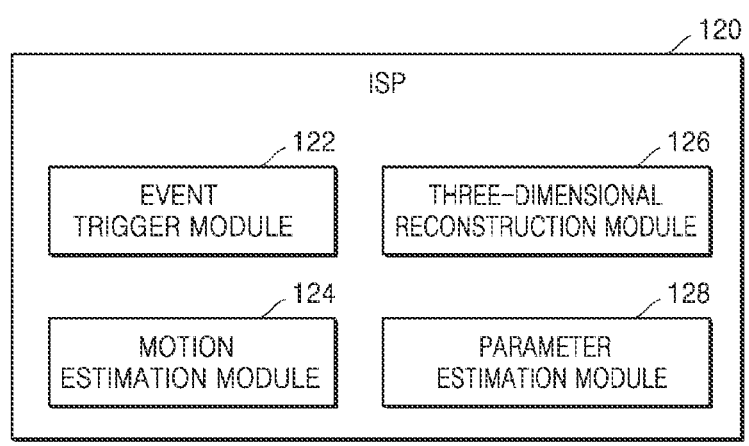
FIG. 3 is a block diagram further illustrating in one example the processor 120 of FIG. 1 according to embodiments of the inventive concept.

FIG. 3 is a block diagram further illustrating in one example the ISP 120 according to embodiments of the inventive concept.

Referring to FIG. 3, the ISP 120 may include an event trigger module 122, a motion estimation module 124, a three-dimensional reconstruction module 126 and a parameter estimation module 128.

The event trigger module 122 may detect a calibration event and trigger an estimation of an external parameter.

In some embodiments, the ISP 120 may designate (or set) a grid-pattern object as an object of interest. When the ISP 120 detects an object including a grid pattern from an image acquired through the camera 110, the ISP 120 may determine whether the object is a vertical plane including a grid pattern for calibration and trigger estimation of an external parameter according to the determination result.

In some embodiments, the ISP 120 may trigger measurement of an external parameter in response to reception of a control signal from a wireless communication circuit (not shown) of the host vehicle 200. For example, in a region in which the grid pattern for calibration is provided, a device configured to transmit a wireless signal for triggering camera calibration to a target vehicle passing nearby may be provided. Here, the wireless signal may be a Bluetooth-based beacon signal. The host vehicle 200 may receive the beacon signal through the wireless communication circuit and communicate the beacon signal (or receipt of the beacon signal) to the ISP 120. Upon receiving the beacon signal, the ISP 120 may identify that the grid pattern for calibration is present near the host vehicle 200 and trigger measurement of an external parameter. That is, in response to the reception of the beacon signal, a region of interest including a grid-pattern object may be extracted.

In some embodiments, the motion estimation module 124 may extract feature points and estimate a motion parameter for the host vehicle 200 based on change(s) in the feature points. The motion parameter may include a rotation matrix indicating how far the feature points have rotated during continuous frames, and a translation vector indicating how much the feature points have been translated during the continuous frames.

In some embodiments, the motion estimation module 124 may estimate the motion parameter of the host vehicle 200 based on change(s) in the feature points using a constraint condition that a plane including the grid-pattern object is vertical to the ground. The motion estimation module 124 may calculate an essential matrix based on a sequence of the feature points and calculate the rotation matrix and the translation vector by decomposing the essential matrix.

In some embodiments, the three-dimensional reconstruction module 126 may transform two-dimensional coordinates for an image plane into three-dimensional coordinates of the camera coordinate system. The three-dimensional reconstruction module 126 may reconstruct the three-dimensional coordinates using triangulation, for example. In this regard, triangulation may use a relationship between feature points when viewing the target vehicle from different views based on epi-polar geometry. The reconstructed three-dimensional coordinates may correspond to three-dimensional coordinates of the camera coordinate system.

In some embodiments, the parameter estimation module 128 may estimate the external parameter for the camera 110. For example, the parameter estimation module 128 may estimate the external parameter, as expressed by a pitch angle, a roll angle and a camera height using the three-dimensional coordinates reconstructed through the three-dimensional reconstruction module 126, as well as constraints between the feature points. Here, the constraints may indicate that an x-coordinate and a y-coordinate of feature points located on a straight line that is vertical to the ground in a vehicle coordinate system are the same, wherein a vertical spacing (a z-coordinate difference) of feature points vertically adjacent to each other is predefined.

Figure 4:
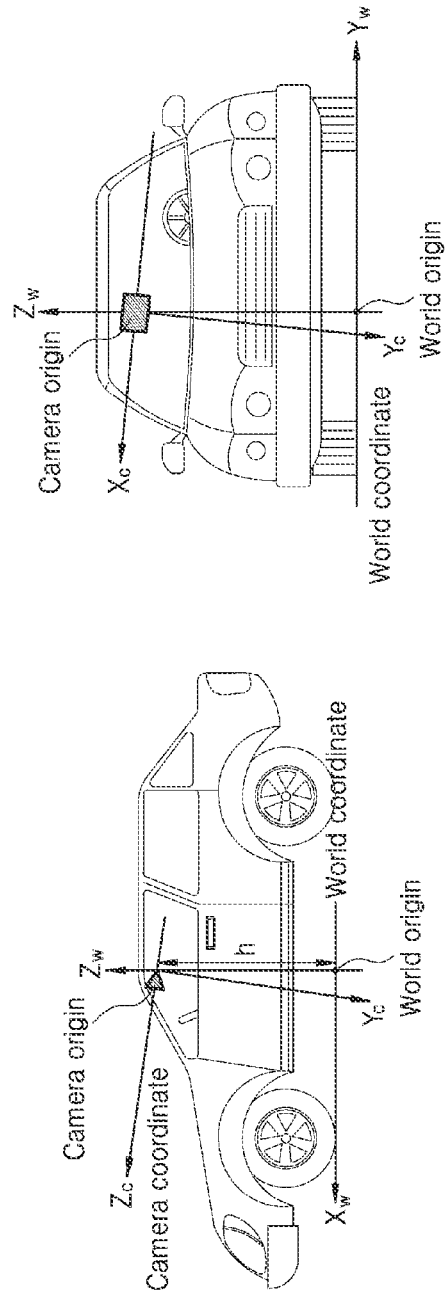
FIG. 4 is a conceptual diagram illustrating a camera coordinate system and a vehicle coordinate system according to embodiments of the inventive concept.

FIG. 4 is another conceptual diagram illustrating the use of a camera coordinate system and a vehicle coordinate system according to embodiments of the inventive concept.

Here, a world coordinate system may assumed as a coordinate system representing a real-world, external environment associated with the camera calibration apparatus 100. In some embodiments, when the camera 110 of the camera calibration apparatus 100 is set as a geometric origin (e.g., 0, 0, 0), the world coordinate system may be referred to as the camera coordinate system. Alternatively, when a point along a vertical, straight line extending to intersect the ground is set as the origin, the world coordinate system may be referred to as the vehicle coordinate system. Hereinafter, for convenience of description, a three-dimensional coordinate system will be described with reference to the camera coordinate system and the vehicle coordinate system.

In some embodiments, the camera coordinate system or the vehicle coordinate system may be expressed in relation to an $X_c$-axis, a $Y_c$-axis, and a $Z_c$ axis. For example, in the camera coordinate system, the $Z_c$ axis may correspond to a "forward direction" relative to the camera 110 imaging view, the $X_c$-axis may correspond to a right direction with reference to the forward direction, and the $Y_c$-axis may correspond to a down direction with reference to the forward direction.

In some embodiments, the vehicle coordinate system may be expressed in relation to an $X_w$-axis, a $Y_w$-axis, and a $Z_w$-axis. For example, in the vehicle coordinate system, the $X_w$-axis may correspond to a direction in which the host vehicle 200 travels, the $Z_w$-axis may correspond to a direction which is vertical to the ground, and the $Y_w$-axis may correspond to a left direction with reference to the direction in which the host vehicle 200 travels.

Referring to FIG. 4, the $Y_c$-axis of the camera coordinate system may be offset from the $Z_w$-axis of the vehicle coordinate system by a pitch angle, the $Z_c$ axis of the camera coordinate system may be offset from the $X_w$-axis of the vehicle coordinate system by a yaw angle, and the $X_c$-axis of the camera coordinate system may be offset from the $Y_w$-axis of the vehicle coordinate system by a roll angle. That is, due to external factors such as shifting, rising/falling, etc., of the host vehicle 200 while traveling, the axes for each of the camera coordinate system and the vehicle coordinate system may change (thereby yielding variable pitch, roll, and yaw angles). The value of a camera height 'h' may also change.

Nonetheless, a yaw angle formed between the $Z_c$ axis of the camera coordinate system and the $X_w$-axis of the vehicle coordinate system may be acquired by calculating a focus of expansion (FOE), where the FOE indicates a point—at which respective motions that feature points of an image, as translated—converge when the camera 110 moves in one direction (e.g., when only a translation vector is changed).

Figure 5A:
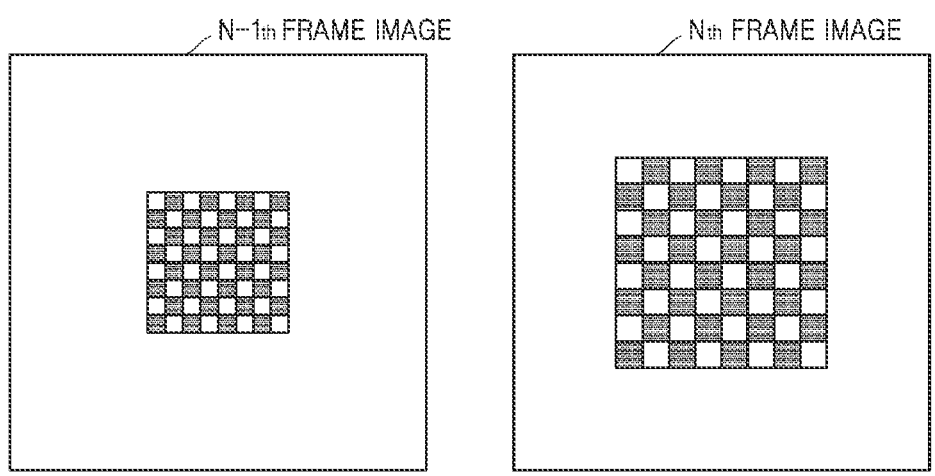
FIG. 5A illustrates a change in a frame according to traveling of a vehicle according to embodiment of the inventive concept.
Figure 5B:
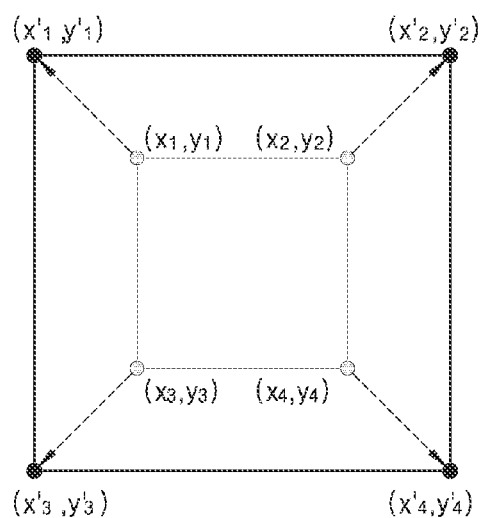
FIG. 5B illustrates a change in feature points according to embodiments of the inventive concept.

FIG. 5A illustrates a change in a frame in response to traveling of a host vehicle according to embodiments of the inventive concept, and FIG. 5B illustrates a change in feature points according to embodiments of the inventive concept.

An image plane may indicate a two-dimensional region on which real world is projected through the camera 110. Because the image plane is a two-dimensional region, the image plane may have a coordinate system identified in a pixel unit. This coordinate system may be referred to as an image coordinate system. For example, when a left upper end of the image plane is set as the origin, a right direction may be represented as an x-axis, and a down direction may be represented as a y-axis. Each (x, y) component of the image plane may have a pixel unit.

FIG. 5A illustrates a case wherein a plane including a grid-pattern object is vertical to the ground, and the host vehicle 200 travels toward the plane. That is, the apparent size of the grid-pattern object in an (n−1)th frame increases in an nth frame.

FIG. 5B illustrates a change in feature points forming at least one quadrangle in a grid pattern. For example, in a first frame, feature points forming a quadrangle may include first to fourth points, wherein coordinates of the first point are $(x_1, y_1)$, coordinates of the second point are $(x_2, y_2)$, coordinates of the third point are $(x_3, y_3)$, and coordinates of the fourth point are $(x_4, y_4)$. In a second frame, when the host vehicle 200 travels in a forward direction, and the grid-pattern object is at the front of the host vehicle 200 and on a plane that is vertical to the ground, each of the first to fourth points may be translated in an outer direction. Coordinates of the translated first point may be $(x'_1, y'_1)$, coordinates of the translated second point may be $(x'_2, y'_2)$, coordinates of the translated third point may be $(x'_3, y'_3)$, and coordinates of the translated fourth point may be $(x'_4, y'_4)$.

FIG. 6 is a flowchart summarizing a method of operation for the camera calibration apparatus 100 according to embodiments of the inventive concept.

In the illustrated method, the camera calibration apparatus 100 may extract a region of interest from an image frame (S110). That is, the camera 110 may acquire an image in every frame and transmit the acquired image to the ISP 120, and the ISP 120 may scan whether the image includes a predefined region of interest.

In some embodiments, the region of interest may at least include the grid-pattern object, such as the one shown in FIG. 5A (e.g., a quadrangular road sign, a red fireplug box, etc.). Here, for example, the region of interest may include all quadrangular shapes having a predefined minimum vertical length. In this regard, a vertical length of a grid-pattern object for camera calibration may be pre-stored in the camera calibration apparatus 100. (It should be noted here, that all of the quadrangular road signs and red fireplug boxes may conform to a length defined by local traffic laws).

The camera calibration apparatus 100 may now extract feature points from the region of interest (S120). For example, the feature points may include four vertexes forming a quadrangle. A vertical length of the quadrangle formed by the feature points may be predefined.

The camera calibration apparatus 100 may acquire a motion parameter based on translation of the feature points (S130). Referring to FIG. 5B, the coordinates of the first point may change from $(x_1, y_1)$ to $(x'_1, y'_1)$ as the host vehicle 200 travels.

In some embodiments, assuming that internal parameter(s) of the camera 110—which may include a focal length, a principal point and a skew coefficient of zero—are already known, the camera calibration apparatus 100 may normalize the feature points in each of the first frame and the second frame using Equation 1.

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} x \\ y \\ 1 \end{bmatrix} \quad \text{[Equation 1]}$$

Here, x and y denote components of a pixel coordinate system, $f_x$ and $f_y$ denote focal lengths, and $c_x$ and $c_y$ denote principal points. By normalizing feature point coordinates in the first frame and the second frame, the image coordinate system may be transformed to the pixel coordinate system which is unaffected by the internal parameter(s).

Accordingly, the camera calibration apparatus 100 may calculate an essential matrix E based on Equation 2.

$$[u' \; v' \; 1] E \begin{bmatrix} u \\ v \\ 1 \end{bmatrix} = 0 \quad \text{[Equation 2]}$$

Here, u and v denote normalized pixel coordinates of the first frame, and u' and v' denote normalized pixel coordinates of the second frame. The essential matrix E satisfying Equation 2 may be expressed in terms of Equation 3.

$$E = [t]_x R \quad \text{[Equation 3]}$$

Here, t denotes a translation vector, R denotes a rotation matrix, and the mathematical operator x denotes a cross product. It follows that the camera calibration apparatus 100 may acquire the motion parameter by decomposing the acquired essential matrix E into the rotation matrix and the translation vector.

Referring to the method of FIG. 6, the camera calibration apparatus 100 may acquire three-dimensional coordinates of the camera coordinate system corresponding to the feature points based on the motion parameter and triangulation (S140). In some embodiments, a transformation relationship between the camera coordinate system and the vehicle coordinate system may be expressed by Equation 4.

$$X_C = R(\theta,\phi;\psi) X_W + t(\theta,\phi,h;\psi) \quad \text{[Equation 4]}$$

As noted above, feature points are on a plane that is vertical to the ground, and thus, a resulting homography is valid. Here, $R(\theta,\phi;\psi)$ denotes a rotation matrix of the homography, $t(\theta,\phi,h;\psi)$ denotes a translation vector of the homography, $X_W$ denotes the vehicle coordinate system, and $X_C$ denotes the camera coordinate system. In addition, $\theta$ denotes a variable pitch angle, $\phi$ denotes a variable roll angle, $\varphi$ denotes a variable yaw angle, and h denotes a variable camera height. The vehicle coordinate system, the camera coordinate system, and rotational transformation may be expressed in terms of Equations 5, 6 and 7.

$$X_C = [X_C, Y_C, Z_C]^T \quad \text{[Equation 5]}$$

$$X_W = [X_W, Y_W, Z_W]^T \quad \text{[Equation 6]}$$

$$R(\theta,\phi;\psi) = \begin{bmatrix} c_\theta s_\psi c_\phi + s_\theta s_\phi & -c_\psi c_\phi & -s_\theta s_\psi c_\phi + c_\theta s_\phi \\ c_\theta s_\psi s_\phi - s_\theta s_\phi & -c_\psi s_\phi & -s_\theta s_\psi s_\phi - c_\theta c_\phi \\ c_\theta c_\psi & s_\psi & -s_\theta c_\psi \end{bmatrix} \quad \text{[Equation 7]}$$

Here, the rotation matrix may be represented by $\sin \theta = s_\theta$ and $\cos \theta = c_\theta$. The origin (0, 0, 0) in the camera coordinate system corresponds to a vertical point (0, 0, h) in accordance with the camera height h in the vehicle coordinate system as expressed in Equation 8.

$$0 = R(\theta,\phi;\psi) \cdot [0,0,h]^T + t(\theta,\phi,h;\psi) \quad \text{[Equation 8]}$$

With Equation 8 in mind, the translation vector may be expressed in terms of Equation 9.

$$t(\theta,\phi,h;\psi) = -r_3 h \quad \text{[Equation 9]}$$

Here, $r_3$ denotes a third column in the rotation matrix.

Referring still to the method of FIG. 6, the camera calibration apparatus 100 may estimate an external parameter by using a relationship of the feature points (S150). As noted above, the feature points are on a plane that is vertical to the ground, and a height (a vertical length) of a quadrangle formed by the feature points is predefined. In addition, feature points located on a normal that is vertical to the ground have the same values of $X_w$ and $Y_w$ and different values of $Z_w$. Thus, a constraint relationship between the feature points may be expressed by Equations 10, 11, and 12.

$$X_C^i - X_C^j = -(s_\theta s_\psi c_\phi - c_\theta s_\phi)(Z_W^i - Z_W^j) \quad \text{[Equation 10]}$$

$$Y_C^i - Y_C^j = -(s_\theta s_\psi s_\phi + c_\theta c_\phi)(Z_W^i - Z_W^j) \quad \text{[Equation 11]}$$

$$Z_C^i - Z_C^j = -s_\theta c_\psi (Z_W^i - Z_W^j) \quad \text{[Equation 12]}$$

Here, Equation 10 again expresses a feature wherein a difference between an x component of ith coordinates and an x component of zth coordinates in the vehicle coordinate system is zero, Equation 11 again expresses a feature wherein a difference between a y component of the ith coordinates and a y component of the zth coordinates in the vehicle coordinate system is zero. In Equation 12, $Z_W^i - Z_W^j$ denotes a vertical length as described above and may be predefined.

In view of Equations 9, 10, 11 and 12, the pitch angle $\theta$ and the roll angle $\phi$ may be expressed by Equations 13 and 14.

$$s_\theta = -\frac{Z_C^i - Z_C^j}{c_\psi (Z_W^i - Z_W^j)} \quad \text{[Equation 13]}$$

$$s_\phi = \frac{c_\theta (X_C^i - X_C^j) - s_\theta s_\psi (Y_C^i - Y_C^j)}{(s_\theta^2 s_\psi^2 + c_\theta^2)(Z_W^i - Z_W^j)} \quad \text{[Equation 14]}$$

Here, assuming the yaw angle φ has been acquired by calculating a FOE, the rotation matrix may be determined according to Equations 13 and 14. Additionally, the camera height h may be estimated using Equation 15 using a feature of the homography.

$$[r_1, r_2, -r_3][X_W, Y_W, h]^T = X_C - r_3 Z_W \quad \text{[Equation 15]}$$

In some embodiments, even without acquiring three-dimensional coordinate values of the vehicle coordinate system, the camera calibration apparatus 100 may estimate a motion parameter based on a change in feature points on the pixel coordinate system, transform the feature points of the pixel coordinate system into three-dimensional coordinates of the camera coordinate system based on the motion parameter and triangulation, and estimate an external parameter based on a transformation relationship between the camera coordinate system and the vehicle coordinate system and constraints of the feature points of the vehicle coordinate system.

Figure 7A:
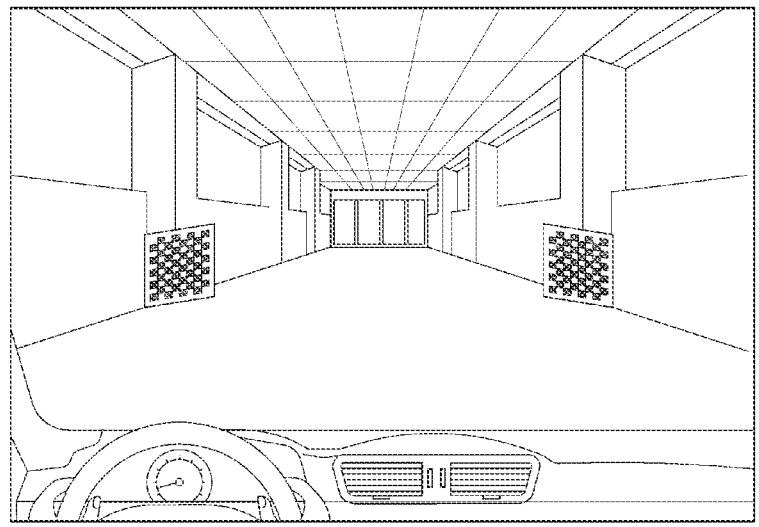
FIGS. 7A and 7B are respective conceptual diagrams illustrating a plane which is vertical to the ground according to embodiments of the inventive concept.

FIG. 7A is a conceptual diagram illustrating a vertical plane for camera calibration according to embodiments of the inventive concept.

Here, the image presented by FIG. 7A, may correspond to a forward image in an indoor environment through which the host vehicle 200 travels. In this regard, the indoor environment may include (or simulate) various traveling environments, such as a service center providing vehicle maintenance, an underground parking garage, a warehouse or a factory receiving vehicle deliveries, etc.

In some embodiments, two or more vertical planes may be disposed in the image of FIG. 7A. For example, a left vertical plane in FIG. 7A may indicate a first plane, and a right vertical plane of FIG. 7A may indicate a second plane. The camera calibration apparatus 100 may estimate an external parameter using feature points on the first plane. The external parameter estimated based on the first plane may correspond to a first external parameter. In parallel with the calculation of the first external parameter, the camera calibration apparatus 100 may estimate a second external parameter using feature points on the second plane.

The camera calibration apparatus 100 may then determine a final external parameter based on the first external parameter and the second external parameter. For example, in some embodiments, the camera calibration apparatus 100 may determine the final external parameter by averaging the first external parameter and the second external parameter.

Figure 7B:
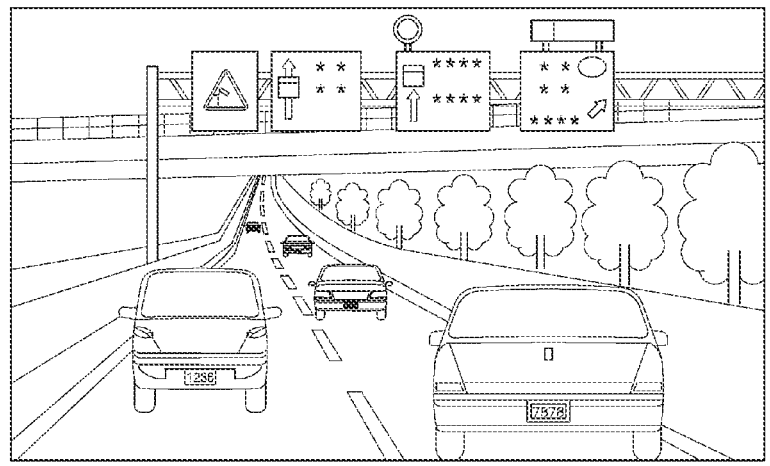

FIG. 7B is a conceptual diagram illustrating a vertical plane for camera calibration according to embodiments of the inventive concept.

Here, the image presented by FIG. 7B, may correspond to a forward image of an external environment (e.g., a road) along which the host vehicle 200 travels. As the host vehicle 200 travels along the road, a resulting forward image may include various types of signs, such as road signs, traffic safety signs, etc.

In some embodiments, the various types of signs may have respective and unique (e.g., government mandated) characteristics, such as a height value, a size, road-side disposition, as well as various sign information requirements. Accordingly, the camera calibration apparatus 100 may store such characteristics (e.g., a height value) for various types of signs. Alternately, in some embodiments, the camera calibration apparatus 100 may acquire vertical height information for various signs while traveling.

In this regard, the host vehicle 200 may store three-dimensional map information in memory, wherein the three-dimensional map information may include (e.g.,) elevation information for the road, height information for various objects along the road, etc. Accordingly, the camera calibration apparatus 100 may load the three-dimensional map information, acquire vertical height information of a sign while traveling, and calibrate an external parameter using the vertical height information of a quadrangular object forming the sign even while traveling along the road.

In some embodiments, the camera calibration apparatus 100 may set a sign shape as an object of interest and identify a road sign in real-time while traveling along the road. The ISP 120 may identify a road sign, identify to which sign the identified road sign corresponds to using (e.g.,) various government or trade association standards using an optical character reader (OCR) module, and load a height value for the identified sign. That is, the camera calibration apparatus 100 may estimate an external parameter according to the loaded height value using the expression $Z_W^i - Z_W^j$ of Equation 12.

Although the inventive concept has been described in relation to multiple embodiments that assume the host vehicle 200 estimates an external parameter using a road sign while traveling along a road, the inventive concept is not limited thereto. For example, a sign including the grid-pattern object shown in FIG. 7A may be provided on a road. In this case, the host vehicle 200 may estimate an external parameter according to the predefined vertical length of a grid using the expression $Z_W^i - Z_W^j$ of Equation 12.

Further, while the inventive concept has been described in relation to multiple embodiments, those skilled in the art will understood that various changes in form and detail may be made to these embodiments without departing from the spirit and scope of the inventive concept as defined by the following claims.

What is claimed is:

1. A camera calibration apparatus, comprising:
a camera configured to acquire a first forward image from a first viewpoint and a second forward image from a second viewpoint;
an event trigger module configured to determine whether to perform camera calibration;
a motion estimation module configured to acquire information related to motion of a the host vehicle;
a three-dimensional reconstruction module configured to acquire three-dimensional coordinate values based on the first forward image and the second forward image; and
a parameter estimation module configured to estimate an external parameter for the camera based on the three-dimensional coordinate values,
wherein the motion estimation module is further configured to extract a first feature point group from the first forward image, extract a second feature point group from the second forward image, calculate an essential matrix based on a change in the first feature point group and a change in the second feature point group, and acquire a rotation matrix and a translation vector based on the essential matrix.

2. The camera calibration apparatus of claim 1, wherein the external parameter includes at least one of a height, a roll, a pitch, and a yaw of the camera.

3. The camera calibration apparatus of claim 1, wherein the event trigger module is further configured to enable the motion estimation module in response to identifying an object having a predefined quadrangular shape, or identifying the object having a shape including a grid pattern.

4. The camera calibration apparatus of claim 3, wherein the three-dimensional coordinate values are included in a camera coordinate system.

5. The camera calibration apparatus of claim 1, wherein each of the first feature point group and the second feature point group is disposed on a plane that is vertical to ground on which the host vehicle travels.

6. The camera calibration apparatus of claim 5, wherein each of the first feature point group and the second feature point group includes vertexes associated with a quadrangular shape, and a height of the quadrangular shape has a predefined value.

7. The camera calibration apparatus of claim 1, wherein the three-dimensional reconstruction module is further configured to acquire three-dimensional coordinates corresponding to feature points based on the rotation matrix, the translation vector, and triangulation between the first forward image and the second forward image.

8. The camera calibration apparatus of claim 7, wherein the parameter estimation module is further configured to input a vertical height of the feature points on a vehicle coordinate system as a predefined value and estimate the external parameter based on a feature that a difference between an x-coordinate and a y-coordinate of the feature points on the vehicle coordinate system is zero.

9. A camera calibration method comprising:
extracting a region of interest from a first forward image and from a second forward image;
extracting feature points from the region of interest;
acquiring a motion parameter based on translation of the feature points;
estimating three-dimensional coordinate values of a camera coordinate system corresponding to the feature points using triangulation based on the acquired motion parameter; and
estimating an external parameter for a camera using a relationship of the feature points and the three-dimensional coordinate values,
wherein the acquiring of the motion parameter comprises
extracting a first feature point group from the first forward image,
extracting a second feature point group from the second forward image,
calculating an essential matrix based on a coordinate change in the first feature point group and a coordinate change in the second feature point group, and
acquiring a rotation matrix and a translation vector based on the essential matrix.

10. The camera calibration method of claim 9, wherein the extracting of the region of interest comprises at least one of identifying an object having a predefined quadrangular shape and identifying a shape including a grid pattern.

11. The camera calibration method of claim 9, wherein the external parameter includes at least one of a height, a roll, a pitch, and a yaw of the camera.

12. The camera calibration method of claim 9, wherein each of the first feature point group and the second feature point group is disposed on a plane that is vertical to ground on which a host vehicle travels.

13. The camera calibration method of claim 12, wherein each of the first feature point group and the second feature point group includes vertexes having a quadrangular shape, and a height of the quadrangular shape has a predefined value.

14. The camera calibration method of claim 9, wherein the estimating of the three-dimensional coordinate values comprises acquiring three-dimensional coordinates corresponding to feature points based on the rotation matrix, the translation vector, and triangulation between the first forward image and the second forward image.

15. The camera calibration method of claim 14, wherein the estimating of the external parameter comprises inputting a vertical height of the feature points on a vehicle coordinate system as a predefined value and estimating the external parameter based on a feature that a difference between an x-coordinate and a y-coordinate of the feature points on the vehicle coordinate system is zero.

16. A host vehicle, comprising:
a camera configured to acquire a first forward image from a first viewpoint and a second forward image from a second viewpoint;
an image signal processor configured to determine whether to perform camera calibration, acquire information related to motion of the host vehicle, acquire three-dimensional coordinate values based on the first forward image and the second forward image, estimate an external parameter for the camera based on the three-dimensional coordinate values, and generate a control signal in response to the external parameter; and
a vehicle controller configured to control operation of the host vehicle in response to the control signal,
wherein the external parameter includes at least one of a height, a roll, a pitch, and a yaw of the camera, and
the image signal processor is further configured to extract a first feature point group from the first forward image, extract a second feature point group from the second forward image, calculate an essential matrix based on a change in the first feature point group and a change in the second feature point group, acquire a rotation matrix and a translation vector based on the essential matrix, and acquire three-dimensional coordinates corresponding to feature points based on the rotation matrix, the translation vector, and triangulation between the first forward image and the second forward image.

17. The host vehicle of claim 16, wherein each of the first feature point group and the second feature point group is disposed on a plane that is vertical to ground on which the host vehicle travels.

* * * * *